United States Patent [19]
Ross et al.

[11] 3,815,619
[45] June 11, 1974

[54] FAST ACTING VALVE

[75] Inventors: George F. Ross; Marvin N. Swink, both of Albuquerque, N. Mex.

[73] Assignee: The United States of America as represented by the United States Atomic Energy Commission, Washington, D.C.

[22] Filed: Aug. 31, 1972

[21] Appl. No.: 285,400

[52] U.S. Cl.................. 137/68, 137/514, 251/68, 251/303
[51] Int. Cl............................................. F16k 31/00
[58] Field of Search ....................... 137/68–71, 137/DIG. 5, 514, 456; 251/228, 66–70, 73, 74, 297, 303

[56] References Cited
UNITED STATES PATENTS

| | | | |
|---|---|---|---|
| 1,000,719 | 8/1911 | Cram .............................. | 137/527 X |
| 2,296,648 | 9/1942 | McMahon......................... | 251/73 X |
| 2,717,001 | 9/1955 | Perrault ............................ | 137/514 |
| 2,721,571 | 10/1955 | Gershon............................ | 251/73 X |
| 2,924,235 | 2/1960 | Knudsen ........................... | 251/68 X |
| 3,587,601 | 6/1971 | Shippy ............................. | 137/68 X |
| 3,665,958 | 5/1972 | Dunkelis.......................... | 137/527 X |

Primary Examiner—William R. Cline
Assistant Examiner—Richard Gerard
Attorney, Agent, or Firm—John A. Horan; John A. Koch

[57] ABSTRACT

A fast acting valve for effecting very rapid gas-tight closure which requires only a relatively small enlargement of the outer dimensions of the pipe system. The valve employs a pivotally mounted cover plate held in the open position by a releaseable fastening means, such as an explosive bolt, and a valve operator which applies force on the cover plate that causes it to rapidly rotate into its closed position upon release of the fastening means.

9 Claims, 3 Drawing Figures

3,815,619

FAST ACTING VALVE

BACKGROUND OF THE INVENTION

The invention described herein was made in the course of or under Contract AT(29-1)-1183 with the U.S. Atomic Energy Commission.

This invention relates to valves, and more particularly to a valve construction which is capable of effecting gas tight closures in a small fraction of a second even in relatively large pipe systems, and yet requires only a relatively small enlargement of the outer dimensions of a pipe system.

There are a number of applications where the ability to accomplish a gas-tight closure in a fraction of a second is absolutely essential. One such application is found in the underground testing of nuclear explosives. One system utilized to gain information regarding the characteristics of a nuclear explosive through underground tests employs the use of a pipe (or pipes) in a line of sight (LOS) relationship to the buried explosive. Instruments to measure the radiation emitted upon detonation of the explosive are positioned within the pipe and intercept the radiation front as it proceeds through the pipe.

However, it is necessary to protect these instruments from the shock front which follows the radiation front through the pipe at a very small time differential. It is also necessary to provide a gas-tight seal to prevent release of radioactivity to the atmosphere through the LOS pipe. Accordingly, valves with extremely short closure times have been sought for placement between the explosive and the instruments in LOS pipe systems.

In addition to the requirement for a short closure time, it is also important that the enlargement of the outer dimensions of the LOS pipe system necessitated by the valve be minimized. This is of importance since the cost of drilling holes in the ground increases approximately as the square of the hole diameter. The use of fast acting ball valves, or more accurately hemisphere valves, for LOS applications have generally been satisfactory in an LOS size range from about 12 to 31 inches. However, the ratio of the maximum outside dimension to the LOS dimension of these valves had been close to 2. As the desired size of LOS pipes has approached 72 inches, it has become increasingly important to find a valve design with a smaller O.D. to I.D. ratio.

SUMMARY OF THE INVENTION

Accordingly, it is an object of this invention to provide a valve construction for relatively large pipe systems which is capable of effecting extremely rapid closure on the order of a small fraction of a second and yet requires only a very modest O.D. to I.D. ratio. Very briefly summarized, we have found that this and other objects can be accomplished by a valve construction which includes a pivotally mounted cover plate held in its open position by releaseable fastening means and a valve operator which applies force on the cover plate which causes it to rapidly rotate into its closed position upon release of the fastening means. An explosive bolt has proven to be a very satisfactory releaseable fastener. A rod under tension used as the valve operator and a valve cover which is a saddle shaped portion of a cylinder, the outer or convex surface of which is in opposition to fluid flow when in the closed position, have been found to be particularly advantageous. Means for absorbing the kinetic energy of the cover plate upon closure of the valve and latch means to prevent rebound of the cover plate have also been provided.

The objects and advantages of the invention will be more apparent after consideration of the following description of a preferred embodiment thereof.

DESCRIPTION OF A PREFERRED EMBODIMENT

Figure 1:
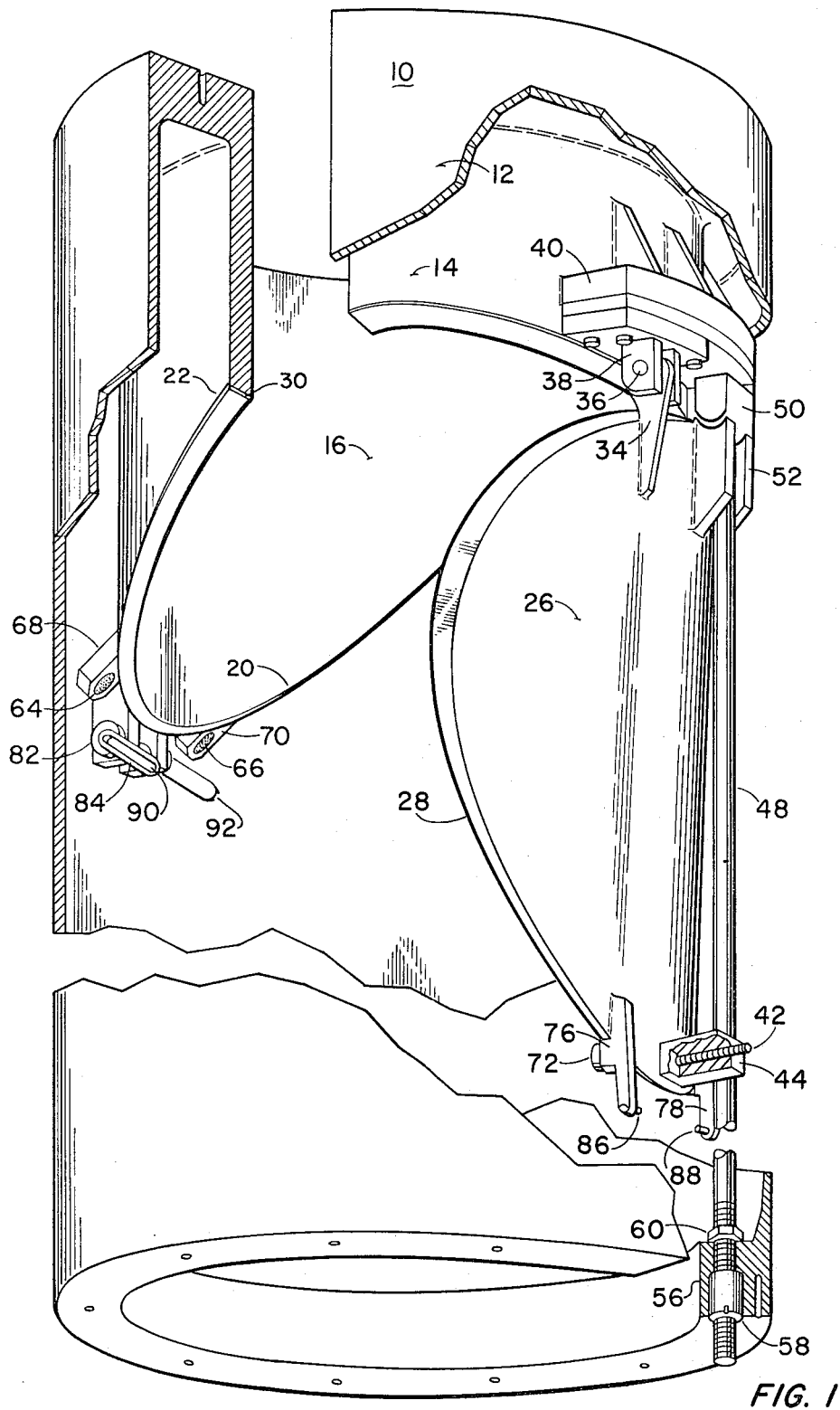
FIG. 1 is a partially broken away, partially in section view of a valve according to the invention, the valve being shown in its open configuration.

Referring now to FIG. 1, the valve mechanism according to the invention includes a housing 10 which has a longitudinally extending outer cylinder 12 and inner cylinder portion 14. Inner surface 16 of inner cylinder 14 defines the valve opening which terminates in a valve seat surface 22. When used in an LOS pipe in connection with the testing of a nuclear explosive, the shock front would come from the direction represented by the bottom of FIG. 1.

Cover or saddle plate 26, shown in its open position, is a portion of a cylinder generally referred to as a saddle. The valve is oriented so that the convex side of saddle plate 26 is presented in opposition to fluid flow in the pipe when in its closed position thereby assisting in holding the plate in its closed position. The end 20 of inner cylinder 14 is machined to form seat surface 22 complementary to a mating seat surface 28 on the inner surface of saddle plate 26. A seal of elastomeric material 30 is placed on one or the other (or both) of the seat surfaces 22 and 28 to facilitate a gas tight closure.

Saddle plate 26 is mounted to housing 10 through a pair of pivot assemblies, only one of which is shown in FIG. 1. Each pivot assembly includes a tongue 34 projecting from saddle plate 26 and a pivot pin 36 which pivotally fastens the tongue to pivot block 38 projecting from support 40, the latter being fastened to inner cylinder 14. When in an LOS application, the mounting of saddle plate 26 would be such that it would not intrude within the LOS, i.e., within the space defined by longitudinal extension of inner surface 16 of inner cylinder portion 14. Cover plate 26 is held in its open position, as shown in FIG. 1, by an explosive bolt 42 which releaseably fastens the plate to holding block 44 which, in turn, is fastened to outer cylinder 12. Means for detonating the explosive of bolt 42, not shown, may be selected from those well known in the art.

Driving rod 48 has a T-head 50 on its upper end which bears against catch or clevis 52. It extends in the longitudinal direction, its opposite threaded end 40 passing through flange 56 of housing 10. Since clevis 52 is positioned radially outwardly from the pivot points (pin 36), downward movement of T-Head 50 will cause rotation of cover plate 26 toward its closed position. With cover plate 26 held in its open position by bolt 42, tightening spanner nut-bushing 58 places the rod under tension thereby storing potential energy in the rod. That potential energy is released upon severence of bolt 42 by detonation of its explosive charge. The downward thrust of T-Head 50 upon release of bolt 42 imparts a high angular acceleration to cover plate 26. After rotation of the cover plate through a relatively small angle, approximately 11½° for the particular configuration illustrated in the drawings, T-Head 50 becomes disengaged from clevis 52 and the cover plate coasts to its fully closed position. Retainer nut 60 prevents loss of the driving rod down the hole.

Figure 2:
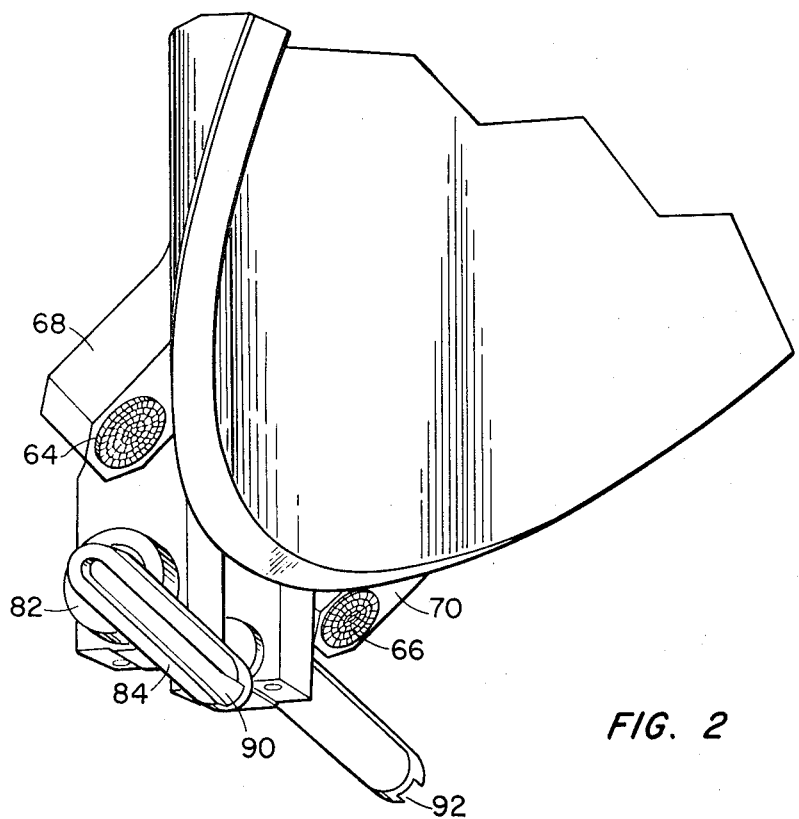
FIG. 2 is an enlarged view of a portion of the valve opening showing the latching means.
Figure 3:
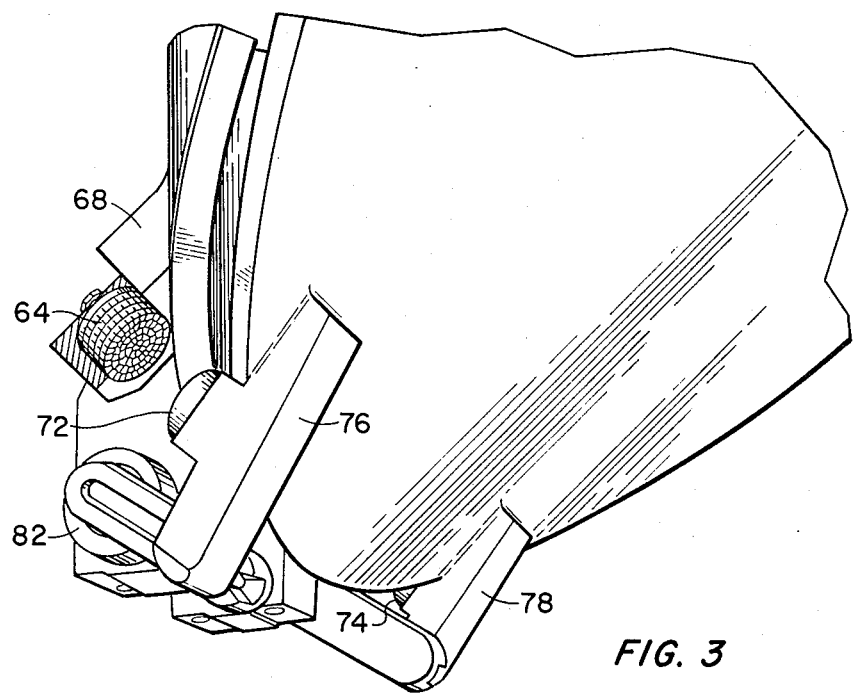
FIG. 3 is a view similar to that of FIG. 2 but additionally shows the cover plate immediately prior to completing its movement toward closure and latching.

Effecting closure of the valve without rebound requires that kinetic energy in the rotating cover plate be dissipated. A pair of crushable honeycomb shock absorbers 64 and 66 contained within cylindrical pockets in shock absorber supports 68 and 70 fastened to the exterior of inner cylinder 14 are provided for that purpose. These are best shown in FIGS. 2 and 3. Bosses 72 and 74 on latch arms 76 and 78 come into forceable engagement with the crushable honeycomb during the last few degrees of rotation of cover plate 26. The quantity of honeycomb material required is, of course, related to the potential energy stored in driver rod 48. Since the honeycomb crushes at a constant value of force, the energy absorbed is proportional to the amount of crush. The latching of the cover plate to inner cylinder 14 is accomplished by a pair of latch mechanisms, each of which includes a backstopping rotary clutch 82 operated by a latch cam 84. Operation of the clutch is initiated upon entry of latch pins 86 and 88 on latch arms 76 and 78 (see FIG. 1) into grooves 90 and 92 of the latch cams.

It will be appreciated that a number of variables concerning the precise geometry of the various features of the valve affects its closure time. An important one of these is the angle through which saddle plate 26 travels to meet inner cylinder 14 at closure. It has been found that a saddle valve for an LOS opening of 40 inches attains a minimum closure time of approximately 180 milliseconds when the total rotation of the saddle plate is through an angle of about 65°. This is about the angle of rotation for the saddle plate of the valve represented in the drawings. While this angle results in a somewhat unique configuration for saddle plate 26 and valve seat surfaces 22 and 28, as can be noted from the drawings, these can be readily obtained by simple turning or boring operations. Of course, the closure time obtainable for a valve wherein seat surfaces 22 and 28 lie in a plane normal to the direction of fluid flow may be satisfactory for a particular application.

With regard to O.D. to I.D. ratio, in a valve generally corresponding to that illustrated by the drawings for an LOS opening of 40 inches, a ratio of about 1.2 to 1 was obtained. This compares to ratios of over 1.5 to 1 for hemisphere valve designs formulated to achieve minimization of that ratio.

While the fundamental novel features of the invention have been shown and described and pointed out as applied to an embodiment particularly described, it will be appreciated by those skilled in the art that various omissions and substitutions may be made within the principle and scope of the invention as expressed in the appended claims.

What we claim is:

1. A fast acting valve comprising:
   a housing extending longitudinally in the direction parallel to fluid flow having an interior portion defining a valve opening,
   a cover plate,
   complementary valve seat surfaces on the interior portion of the housing and the plate,
   complementary means on the housing and the plate for pivotally mounting the plate within the housing for movement from an open position wherein the plate extends longitudinally away from the valve opening to a closed position wherein the plate extends across the valve opening,
   means for releasably fastening the plate to the housing in the open position,
   a catch on the cover plate positioned exterior to the axis of the pivotal mounting, and
   valve operator means for applying force on the cover plate for pivoting the plate from the open position to the closed position upon release of the fastening means, said valve operator means including a rod under tension one end of which releasably engages said catch.

2. The valve of claim 1 wherein said interior portion is a longitudinally extending portion of a cylinder and the cover plate is a saddle shaped portion of a cylinder.

3. The valve of claim 2 wherein the outer cylindrical surface of the saddle is in opposition to fluid flow when the plate is in the closed position.

4. The valve of claim 3 wherein said mounting means on the housing are positioned exterior to the valve opening and the plate does not intrude within the space defined by longitudinal extension of the valve opening when the plate is in the open position.

5. The valve of claim 1 wherein said means for releaseably fastening the plate to the housing includes an explosive charge.

6. The valve of claim 1 including complementary latch and latch receiving means on the housing and the plate for holding the plate in the closed position.

7. The valve of claim 1 including complementary means on the plate and the housing for dissipating kinetic energy from the plate just prior to the end of the movement of the plate from the open to the closed position.

8. The valve of claim 1 including anti-backlash means for preventing the rebound of the plate from the closed position.

9. The valve of claim 8 where the anti-backlash means include a one way rotary clutch.

* * * * *